United States Patent [19]

Emmons et al.

[11] 4,071,489

[45] Jan. 31, 1978

[54] COATING COMPOSITIONS FROM DICYCLOPENTENYL ACRYLATE AND/OR METHACRYLATE

[75] Inventors: William D. Emmons, Huntingdon Valley; Kayson Nyi, Sellersville; Peter R. Sperry, Doylestown, all of Pa.

[73] Assignee: Rohm and Haas Company, Philadelphia, Pa.

[21] Appl. No.: 665,017

[22] Filed: Mar. 8, 1976

[51] Int. Cl.$^2$ .............................................. C09D 3/66
[52] U.S. Cl. .......................... 260/22 CB; 260/22 D; 260/29.2 E; 260/871; 526/328
[58] Field of Search ............... 260/22 CB, 22 D, 871, 260/29.2 E; 526/328

[56] References Cited

U.S. PATENT DOCUMENTS

| 2,414,089 | 1/1947 | Bruson | 260/476 C |
|---|---|---|---|
| 2,462,400 | 2/1949 | Hoover | 526/232 |
| 3,158,584 | 11/1964 | Layman | 260/22 D |
| 3,433,753 | 3/1969 | Farkas et al. | 260/22 CB |
| 3,553,294 | 1/1971 | McGary et al. | 260/22 CB |
| 3,575,904 | 4/1971 | Clarke | 260/22 CB |
| 3,650,669 | 3/1972 | Osborn et al. | 204/159.13 |
| 3,743,615 | 7/1973 | Yethon | 260/22 CB |
| 3,772,062 | 11/1973 | Shur et al. | 260/837 R |
| 3,940,353 | 2/1976 | Martorano | 260/22 CB |

*Primary Examiner*—Ronald W. Griffin

[57] ABSTRACT

This invention is concerned with coating compositions comprising an unsaturated polyol/polycarboxylic acid alkyd or polyester condensate resin (including drying oil-modified alkyd), the polycarboxylic acid or anhydride precursor(s) of which alkyd may be aromatic, aliphatic, or both. In one preferred embodiment Type A, the polyacid is predominantly or exclusively aliphatic and in another Type B, it is predominantly or exclusively aromatic in character. The alkyd or polyester is carried (dissolved) predominantly or exclusively in a substantially non-volatile reactive liquid consisting essentially of a) dicyclopentenyl acrylate or methacrylate or mixtures thereof or of b) a mixture of such (meth-)acrylate with one or more alkyl or alkenyl esters of acrylic or methacrylic acid in which the alkyl and/or alkenyl group contains 10 to 20 carbon atoms. The compositions also contain a polyvalent metal-containing drier or siccative; optionally a volatile agent for inhibiting the action of the drier, i.e., a fugitive stabilizer; they may also contain pigments, rheology control agents, pigment-dispersing agents, and other components.

24 Claims, No Drawings

COATING COMPOSITIONS FROM DICYCLOPENTENYL ACRYLATE AND/OR METHACRYLATE

BACKGROUND OF THE INVENTION

Bruson U.S. Pat. 2,414,089, January 14, 1947, discloses the preparation of esters of hydroxydicyclopentadiene with unsaturated monocarboxylic acids including acrylic acid (Ex. 9), methacrylic acid (Ex. 8), and numerous other unsaturated acids mentioned in the passage of column 3, line 67 to column 4, line 24. Use of the esters as vehicles for paints, varnishes and similar coating materials is mentioned in column 4, lines 25 to 27, and in the passage of lines 62 to 75 of column 6, the linoleate (of Ex. 3) is used with a drier to form a film that is baked to form a varnish-like coating, and other unsaturated higher fatty acids are suggested for this use. The passage in lines 49 to 53 of column 4 states that the new esters may be mixed with drying oils, alkyd resins, hydrocarbons, such as rubber or cyclized rubber, and other oils and resins.

P. D. Bartlett and Abraham Schneider, J.A.C.S. 68, 6 (1946) give the correct structure of the esters produced by Bruson, which he had erroneously named as a result of his theory as to rearrangement.

Hoover U.S. Pat. No. 2,462,400, February 22, 1949, discloses the preparation of copolymers of 20 to 50% by weight of dihydrodicyclopentadienyl methacrylate with saturated ($C_8$-$C_{18}$) aliphatic monohydric alcohol esters of methacrylate acid using an organic peroxide initiator. A solution of the copolymer containing a drier is then used for coating substrates, the coating being air-dried.

In U.S. Pat. No. 3,743,615, a vinyl monomer, such as an alkyl acrylate or methacrylate, styrene, or the like is added to fast air-drying oil-modified alkyd resins.

Dicyclopentenyl acrylate or methacrylate has been suggested for use in photosensitized coating compositions which are to be polymerized by radiation. See U.S. Pat. Nos. 3,650,669 and 3,772,062. However, such compositions require a photo-initiator system, the products are frequently lacking in durability and require the use of high-intensity UV light sources in close proximity to the coated articles to obtain the extent of curing desired or needed in a practical time for industrial operation.

Commercially available coating compositions of autoxidizable type, including impregnating versions thereof, based on oil-modified polyesters or alkyd resins in which the oil modification comprises at least one unsaturated oil of semi-drying or drying type generally provide coating or impregnating films which are often of limited hardness and are seriously lacking in other properties, being especially susceptible to deterioration (yellowing, discoloration, cracking, shrinking and other distortions; decomposition, removal, and the like) by wear and abrasion, chemical attack, particularly organic solvents and alkaline materials, weathering forces, such as wind, rain, and radiation including ultraviolet light rays of the sun, other natural radiation including cosmic rays, e.g., x-rays, B-rays, gamma-rays, as well as radiation emitted by all sorts of artificial means, as in lasers, x-ray machines, and radioactive materials (artificial as well as natural). Coating compositions used to make fluorescent screens in oscilloscopes, television picture tubes, and electron microscopes, are examples of compositions subject to radiation attack.

The present invention is concerned with novel air-drying coating compositions based on alkyd resins having at least one unsaturated component and especially those modified by a drying or semi-drying oil. The new coating compositions comprise dicyclopentenyl acrylate or methacrylate; this monomeric component may consist of either the acrylate or methacrylate or mixtures of both; either of them and mixtures of them are hereinafter referred to generically as DCP(M)A, the individual acrylate and methacrylate being simply referred to as DCPA and DCPMA respectively.

The reactive DCP(M)A monomer or monomers with which the present invention is concerned is the dicyclopentenyl acrylate or methacrylate, alternatively called dihydrodicyclopentadienyl acrylate or methacrylate respectively. This ester may be obtained by the addition of acrylic acid or methacrylic acid respectively to one of the double bonds of dicyclopentadiene. This hydrocarbon compound is represented by the formula:

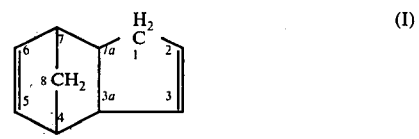

and has the name: 3a,4,7,7a-tetrahydro-4,7-methanoindene (Ring Index, Patterson, 2nd Edition, page 293).

The acrylic ester of the dicyclopentadiene is believed to have the following formula:

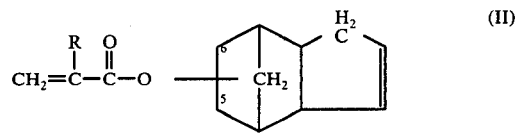

wherein R is H or $CH_3$. The (meth)acryloxy substituent may be on either the 5 or 6 position, the commercial product being a mixture of the two isomers.

Using the numbering system of Formula I hereinabove for the compound of Formula II, it can be seen that the dicyclopentenyl acrylate or methacrylate represented therein may also be called 3a,4,5,6,7,7a-hexahydro-4,7-methanoindenyl acrylate-5 (or 6) or methacrylate-5 (or 6).

The DCP(M)A is a reactive high-boiling liquid acrylic ester monomer or monomer mixture which has been found to have an unusual combination of desirable characteristics for use in coatings: low viscosity, volatility, and toxicity; hydrophobicity and outstanding hydrolytic stability even under acid or alkaline conditions; an outstanding compatibility with a wide range of polymeric and/or resin-forming condensates so that it can be used with or without a small amount of another solvent to form a solution of a polyester having maleate-fumarate type of unsaturation and/or drying oil unsaturation, such as an oil-modified alkyd, optionally with another polymer and/or resin-forming condensate, which can be applied as a coating to any substrate; a reactivity with an unsaturated alkyd, especially with an oil-modified alkyd, optionally in conjunction with other nonvolatile polymeric and/or resin-forming materials, in the presence of a metal-containing siccative or drier whereby the exposure of a coating containing the reactive monomer, the oil-modified alkyd, (optionally also another polymer and/or condensate), and a siccative, with or without other solid ingredients, e.g., pigments, fillers, plasticizers, dyes, etc. to normal atmospheric conditions results in the production of solid films having a desirable combination of characteristics. In the case of 100% solids compositions containing no solvent other than the non-volatile reactive monomer solvent, air-drying to solid state is accomplished without the necessity of volatilizing any solvent material, thereby reducing air pollution and wastage.

The incorporation of DCP(M)A (which acts as a non-volatile reactive diluent or solvent) as the entire vehicle in coating compositions comprising, dissolved in the vehicle, commercially available oil-modified alkyd resins, the polycarboxylic acid component of which is predominantly or primarily of aromatic type, e.g., o-phthalic acid or phthalic anhydride, has sometimes been found to yield products which are extremely hard, in fact, so hard as to be of limited specialty use, for instance, when more than 25% by weight of DCP(M)A is used in conjunction with less than 75% by weight of such an alkyd resin. Excessive hardness in these instances can be avoided if the DCP(M)A is used as a major component of the reactive vehicle in conjunction with a minor amount of another non-volatile reactive liquid ester of a higher ($C_{10}$–$C_{20}$) aliphatic alcohol with acrylic acid or methacrylic acid, and latter reactive monomer being used in sufficient amount relative to the DCP(M)A to counter balance the excessive hardness in the film produced by the DCP(M)A. When it is desired to avoid the use, or to minimize the amount used of volatile non-reactive solvent in coating compositions, the reduction in viscosity of the compositions to a suitable level for application in any particular way (spraying, brushing, roll-coating, etc.) can thus be effected in most, if not all instances by adjusting the proportion of the non-volatile reactive component. Such component may consist of DCP(M)A when an alkyd is of Type A (as defined herein) or when up to about 25% by weight of DCP(M)A is used with about 75% or more alkyd of Type B (as defined herein). However, such component may consist of a mixture of a major amount of DCP(M)A and a minor amount of higher aliphatic alcohol esters of acrylic or methacrylic acid as mentioned above; in this instance, the alkyd may be of either Type A or Type B or a mixture thereof and the relative proportions between the non-volatile reactive component of the vehicle and the alkyd may be anywhere in the ranges specified hereinafter. It is to be understood that, in practice, a proportion of volatile, non-reactive diluent or solvent may be incorporated as a part of the vehicle in the coating composition to be applied in proportions stated hereinafter, but it is preferred in many instances to use such a solvent in small proportions, if at all.

The essential binder-forming components of the coating compositions of the present invention are:

a. Dicyclopentenyl acrylate (DCPA) or methacrylate (DCPMA) or a mixture thereof (Type A), or a mixture of DCP(M)A with at least one other non-volatile reactive monomer, e.g., a ($C_{10}$–$C_{20}$) alkyl acrylate or methacrylate, (Type B), b. A polyester of alkyd having at least one unsaturated component selected from (1) maleic acid or anhydride or fumaric acid type residues or moieties and (2) drying or semidrying oil type residues or moieties, e.g. in linolenic acid.

To this mixture of reactive monomer a) and alkyd b), at the time of use, there is added, if the mixture doesn't already contain a drier:

c. A siccative or mixture thereof.

The relative proportions between the several essential components mentioned may be as follows. The amount of reactive monomer component a) including DCPA or DCPMA may range from about 15 to about 75% of the total amount of components a) and b). However, preferred compositions contain component a) in an amount of about 25 to 60% by weight of a) + b). The proportion of the drier may be quite low and is generally used in the amount of 0.0005 to 2% metal content by weight of a) + b). The drier may be added to the composition prior to storage provided such addition is made in the absence of oxygen or a volatile stabilizer inhibitor is included in the composition to prevent the oxidizing action of the drier and the composition is placed in closed storage containers to prevent volatilization of the inhibitor.

In accordance with one preferred embodiment of the present invention referred to hereinafter as Type A, it has been found that extremely useful oil-modified alkyd resin products can be obtained by the use of DCP(M)A as the predominating, even the entire, vehicle provided the oil-modified alkyd resin is based on polycarboxylic acid predominantly or exclusively of aliphatic dicarboxylic acid component(s) in which the dicarboxylic acid is a saturated or unsaturated aliphatic acid having at least four carbon atoms and up to 36 to 40 or more carbon atoms. The dibasic acids are preferably those in which carboxylic groups are separated by unsubstituted saturated or unsaturated aliphatic hydrocarbon groups although such groups may be substituted by hydroxyl groups as in malic acid or even halogen atoms, e.g. chlorine. Although phthalic acid or anhydride or other aromatic polyacid may form a part of the polycarboxylic acid component of the polyester, it is preferred that at least 30% by weight, and preferably at least 50% by weight of the polycarboxylic component used in making the polyester should be of the aliphatic type just defined. In the optimum situation when DCP(M)A constitutes essentially the entire component a), no aromatic component is present in either the polycarboxylic acid component or any other part of the oil-modified alkyd used in accordance with the present invention. Examples of the aliphatic dicarboxylic acids (useful in either acid or anhydride form) that may be used in forming the unsaturated alkyds including the oil-modified alkyds of the present invention include adipic, maleic, fumaric, pimelic, suberic, azelaic, and sebacic acid. Also useful are the various commercially available grades of dimer acid obtained by polymerizing linoleic acid as described in U.S. Pat. No. 2,482,761 and J. Am. Oil Chemists Association 24, 65 (1947). The composition of one such dimer acid (sold under the designation Emery 955 dimer acid) is described in H. F. Payne, "Organic Coating Technology," Vol. I, pp. 275-7, John Wiley & Sons, Inc., N.Y., 1954, and apparently contains a small proportion of trimers having three carboxyl groups. The pertinent disclosure of these three references is incorporated herein by reference.

In another preferred embodiment, hereinafter referred to as Type B, extremely useful compositions are also obtained from oil-modified alkyd resins derived from, or based on polycarboxylic acids of either aliphatic or predominantly or entirely aromatic types by using, as component a), the DCP(M)A in conjunction with a relatively non-volatile methacrylic or acrylic acid ester of a long-chain aliphatic alcohol, namely, an aliphatic alcohol having from 10 to 20 or more carbon atoms. Such aliphatic esters include decyl acrylate, isodecyl acrylate, undecyl acrylate, lauryl acrylate, cetyl acrylate, pentadecyl acrylate, hexadecyl acrylate and octadecyl acrylate, as well as the corresponding methacrylates and the unsaturated analogues such as oleyl acrylate or methacrylate, linoleyl (meth)acrylate, linolenyl (meth)acrylate, etc.

Instead of, or in addition to, the ($C_{10}$–$C_{20}$) alkyl or ($C_{10}$–$C_{20}$) alkenyl acrylates and methacrylates mentioned hereinabove, there may optionally be included other ethylenically unsaturated monomers of non-volatile character. Examples include vinyl stearate, vinyl laurate, vinyl oleate, and dialkyl fumarates, maleates, and itaconates where the alkyl groups include 1 to 20 carbon atoms. In this Type B preferred embodiment, the amount of such monomers may be from 10 to 40% by weight of the component a), the DCP(M)A being present in predominant amount (and making up the balance to 100%), namely 90% to 60%, of this reactive monomer component a).

Thus, the reactive monomer component may comprise besides the DCP(M)A up to 40% by weight of the long-chain aliphatic alcohol (meth)acrylate. This component of the composition may serve as the entire vehicle so that essentially no volatile solvent component is employed, thereby obtaining a composition that may be considered to be 100% solids in that all components serve to develop the solid resinous mass upon oxidation and polymerization resulting from the inclusion of a drier or siccative. Whereas the most advantageous compositions from the standpoint of control of pollution, minimization of the risks of flammability and toxicity to personnel employing the compositions are those of at least 70%, and preferably 80% to 100%, solids characteristic, nevertheless, the invention also contemplates compositions wherein an amount of volatile solvent may be employed in conjunction with the liquid monomeric component above described to facilitate adjustment of viscosity for application by brushing, spraying, or otherwise, the proportion of volatile solvent being not over about 30% by weight, and preferably not over 20% by weight, of the entire weight of the coating composition.

The coating compositions of the present invention thus may, in more specific aspect, comprise:

a. An essentially non-volatile reactive monomeric material consisting essentially of:
  1. (In Type A compositions) dicyclopentenyl acrylate (DCPA) or methacrylate (DCPMA) or a mixture thereof, this component being generically indicated by the expression DCP(M)A, or
  2. (In Type B compositions) DCP(M)A in predominant proportion in admixture with up to 40% by weight, based on the weight of component a), of a non-volatile ethylenically unsaturated monomer, such as an aliphatic ester of acrylic acid or methacrylic acid in which the alcoholic moiety has from 10 to 20 carbon atoms and may be saturated or unsaturated, b. A polyester or an alkyd having at least one unsaturated component selected from (1) maleic acid or anhydride or fumaric acid type residues or moieties and (2) drying or semi-drying oil type residues or moieties, preferably an oil-modified polyester (or alkyd) comprising:

1. (In Type A compositions) An alkyd in which the dicarboxylic acid component is predominantly or exclusively an aliphatic dicarboxylic acid (or anhydride thereof) having a hydrocarbon group or chain of 2 to 40 or more carbon atoms separating the carboxyl groups and zero to 29% by weight of phthalic acid or anhydride, or
  2. (In Type B compositions) An alkyd as in (1) or an alkyd in which the dicarboxylic acid component may be predominantly or exclusively of aromatic character, c. A polyvalent metal-containing drier or siccative, and if desired,:

d. A polyethylenically unsaturated monomer of low volatility and having at least 2 groups of the formula $H_2C=C<$ up to 25% by weight, but preferably not over 2% by weight, based on total binder weight, to improve water-resistance, solvent-resistance, abrasion-resistance, blocking-resistance, and the like. Examples include glycol or polyol (meth)acrylates, e.g. ethylene glycol di(meth)acrylates, trimethylolpropane tri(meth)acrylate, neopentyl glycol di(meth)acrylate; 1,6-hexanediol di(meth)acrylate; pentaerythritol tri- and tetra- (meth)acrylate; 1,3- and 1,4-butanediol di(meth)acrylate; also allyl (meth)acrylate.

e. A volatile stabilizer for inhibiting the oxidizing action of the drier, f. A volatile solvent in an amount of up to about 30% by weight, but preferably not over 20% by weight, of the entire weight of formulated coating composition ready for application, g. A pigment and/or filler, a dispersing agent therefor, and/or other materials conventionally used in paints, varnishes and the like coating compositions.

Besides the essential components mentioned hereinabove, there may also be included various addition or condensation polymers of thermoplastic type, to the extent that they are compatible with component a) in the presence of component b) with or without a small amount of organic solvent f). Instead of thermoplastic addition polymers, thermosetting condensates, such as an aminoplast, or phenoplast, may be included again to the extent they are compatible. Generally the amounts of such additional polymers and/or condensation products may be from about ½ to 25% by weight based on the weight of a) + b).

The binder of the compositions outlined above consists essentially of the components a) and b) (plus d) if included, and any addition and/or condensation polymers just mentioned in the preceding paragraph, if included) and the vehicle consists of these components and the solvent f) if included. Taking these components into consideration, the preferred relative proportions between them may be as follows:

TYPE A COMPOSITIONS

For each 100 parts by weight of the alkyd b), the amount of monomeric component a), in this instance consisting essentially of DCP(M)A, may be from about 15 to 300 parts by weight, preferably about 25 to 150 parts by weight.

TYPE B COMPOSITIONS

For each 100 parts by weight of alkyd resin, especially such a resin of hard type, i.e., an alkyd in which the polycarboxylic acid component thereof is predominantly or exclusively of aromatic type, particularly those comprising phthalic acid or anhydride, there may be used from about 17 to 300 parts by weight of reactive monomer component a) which comprises 60 to 90% by weight of DCP(M)A and the balance of 40 to 10% by weight respectively of another non-volatile monomer, such as one or more ($C_{10}$–$C_{10}$) alkyl acrylates and/or methacrylates.

In preferred compositions, reliance is primarily placed upon the component a) to provide the desired viscosity for application of the coating composition (e.g., by dipping, brushing, spraying, roll-coating, and the like) so that little or no volatile solvent f) is used in preparation of the coating composition, thereby providing 70% to 100% solids compositions in the sense that the entire binder/vehicle of the composition is cured to produce the solid coating without the necessity to remove an appreciable amount of a volatile solvent therefrom during the curing. By avoiding volatile organic solvent materials, the hazards of fire and toxicity to operators, and the need for solvent recovery systems is avoided.

It is one part or aspect of the present invention to provide a novel and useful mixed liquid of reactive and essentially non-volatile character that can be used as the entire vehicle of coating compositions comprising such common solid binder materials as polyesters (including alkyd and oil-modified alkyd resins), polyisocyanate prepolymers, and the like which can be cured and chemically combined with the reactive component of the vehicle when the films obtained on coating are dried at ambient temperatures or otherwise cured and/or set. This non-volatile reactive liquid comprises a mixture of DCP(M)A and at least one non-volatile monomer selected from the group consisting of (a) higher ($C_{10}$–$C_{20}$) aliphatic alcohol ester of acrylic acid or methacrylic acid such as the ($C_{10}$–$C_{20}$) alkyl and ($C_{10}$–$C_{20}$) alkenyl esters mentioned specifically hereinabove, (b) vinyl esters of higher ($C_{10}$–$C_{20}$) aliphatic acids, such as those specifically mentioned hereinabove, and (c) non-volatile dialkyl fumarates, maleates, and itaconates having ($C_1$–$C_{20}$) alkyl groups. The alkyl groups in the (c) esters may be methyl, ethyl, propyl, pentyl, hexyl, heptyl, octyl, 2-ethylhexyl, decyl, dodecyl, myristyl, palmityl or stearyl. Such a mixture of non-volatile monomers may constitute the entire vehicle or it may be the predominant component of a vehicle which includes some volatile non-reactive solvent in minor proportion.

The non-volatile reactive liquid vehicle just defined may be prepared by mixing and sold by the producer as a mixture ready for use as a formulating ingredient to serve as the entire, or an important part of the, vehicle in making coating compositions by users to whom the mixture is shipped. Besides preparing the non-volatile reactive diluent or solvent mixture in the relative proportions mentioned hereinabove, e.g. 51 to 99% preferably 60 to 90%, by weight of DCP(M)A and 49 to 1%, preferably 40 to 10%, by weight of the other non-volatile monomer component, the DCP(M)A may be supplied as two or more mixtures having various proportions of DCP(M)A therein including a mixture containing as low as 1% by weight of DCP(M)A and 99% of the other non-volatile reactive component and a mixture as high as 99% DCP(M)A. The coating formulator can then mix the two liquids to provide whatever relative proportion needed for the particular coating composition he is concerned with. For example, the relative proportion of DCP(M)A in the non-volatile vehicular medium he uses will depend on the hardness and toughness he seeks and the contribution thereto obtained by the other components of the composition, including especially the particular binder, e.g. and alkyd as discussed herein.

Component c) is any polyvalent metal-containing complex or salt that catalyzes the oxidative curing of drying oils or drying oil-modified alkyd resin. Examples of the driers are various polyvalent metal salts including calcium, copper, zinc, manganese, lead, cobalt, iron and zirconium as the cation. Simple inorganic salts are useful such as the halide, chloride, nitrate, sulfate. However, in circumstances where the vehicle is of organic nature such as those of the present invention, it is frequently preferred to use salts of organic acids such as the acetylacetonate, acetate, propionate, butyrate and the like. The driers may also be complex reaction products of metal oxides, acetates, or borates and vegetable oils. Generally, the most useful driers are salts of naphthenic acids or of ($C_8$ to $C_{30}$) aliphatic acids. Examples of the polyvalent metal include calcium, copper, zinc, manganese, lead, cobalt, iron, and zirconium. Examples of the aliphatic or fatty acid component or anion of the drier salt is that of naphthenic acids, resinic acids, (that is, rosin acids), tall oil fatty acids, linseed oil fatty acids, 2-ethylhexoic acid, lauric acid, palmitic acid, myristic acid, stearic acid, oleic acid, linoleic acid, linolenic acid, behenic acid, cerotic acid, montanic acid, and abietic acid. Preferred drier salts are those of cobalt and manganese, such as cobalt octoate, cobalt naphthenate and manganese octoate and naphthenate. Mixtures of various driers may be used. The driers mentioned in "Encyclopedia of Chemical Technology," Kirk-Othmer, Volume 5, pages 195–205, published by Interscience Encyclopedia, Inc., N.Y. (1950) may be used.

The proportion of the drier may be quite low and is generally used in the amount of 0.0005 to 2% metal content by weight of a) + b). The drier may be added to the composition prior to storage provided such addition is made in the absence of oxygen or a volatile stabilizer e) is included in the composition to inhibit or prevent the oxidizing action of the drier and the composition is placed in closed storage containers to prevent volatilization of the inhibitor. The stabilizer may be used in a small proportion of 0.1% to 2% by weight based on the weight of components a) + b). The stabilizer is generally a volatile ketone-oxime or aldehyde-oxime. Specific examples are methyl ethyl ketone-oxime, methyl butyl ketone-oxime, 5-methyl-3-heptanone-oxime, cyclohexanone-oxime, and butyraldehyde-oxime. Addition of such inhibitors is essential if long stability and pot life of the blends of components a), b), and c) is desired.

Typical drying oils that may be employed as the oil-modifying component of alkyd b) (in either Type A or Type B Compositions) are mono-, di-, and tri-glycerides of higher fatty acids having a relatively high degree of unsaturation such as linseed oil, safflower oil, tung oil, soybean oil, dehydrated castor oil, oiticica oil, menhaden oil etc. Component b) alkyd may comprise combined therein one or more of such drying oils whether of tri-glyceride, monoglyceride, di-glyceride type or the corresponding carboxylic acid or anhydride. Use of the term "drying" oil is intended in the claims herein to embrace those oils, whether of natural or artificial origin, that are characterized by reaction with oxygen to form cured solid products. It is intended to embrace in this term those so-called "semidrying" oils which, because of a lesser degree of unsaturation, are not as rapid in curing in this fashion as the most typical drying oils that are on this account most commonly used in the paint and varnish industries. Thus, the oil-modified alkyds with which the invention is concerned are those in which at least a part of the oil-modification is composed of a drying (or semi-drying) oil.

The type of alkyd with which Type A Compositions of the present invention is concerned is limited to those based on the use of aliphatic dicarboxylic acids as defined hereinabove with polyols, namely the alkyds obtainable from aliphatic ($C_4$–$C_{40+}$) dicarboxylic acids, such as maleic, fumaric, adipic, pimelic, azelaic, sebacic, adipic, glutaric, the ($C_{36}$) dimer acid made from linoleic acid, or various mixtures of these various dicarboxylic acids or anhydrides thereof as well as mixtures thereof with up to 70% by weight of phthalic acid or anhydride, preferably not over 50% by weight thereof, based on total weight of dicarboxylic acid combined in the alkyd. The polyols used in making the alkyd may have two to six hydroxyl groups and from two to eight carbons and include ethylene glycol, diethylene glycol, glycerol, propylene glycol, erythritol, pentaerythritol. There is no intention to spell out any limitation as to the method by which the oil-modified alkyd resin is produced since the method of making this particular component, if used in the composition, is wellknown. The alkyds employed may be long-, medium-, or short-oil products. Generally, the short-oil alkyds have about 42 to 50% oil to 45 to 39% of the diacid used in making the alkyd; the medium-oil alkyds contain 53 to 61% oil to 36 to 30% of the diacid and the long-oil alkyd contains about 64 to 70% oil to 28 to 23% diacid. Preferably, the medium-oil-modified alkyds and the long-oil-modified alkyds are employed in the compositions of the present invention. Such oil-modified resins are generally adaptable to air-drying whereas the short-oil-modified alkyds generally require baking to accomplish their curing. The oil moiety of the component b) alkyd also provides a factor that can be used to compensate partly or fully or even over-compensate for the hardness imparted by component a). This can be accomplished by balancing the relative proportions between the two components to provide the desired effect.

In this Type A composition, the alkyd may be derived from an ethylenically unsaturated diacid, such as fumaric acid, maleic acid, maleic anhydride and dimer acid. Thus, part or all of the unsaturation functionality contributed by modification of the alkyd by an oil having air-drying characteristics may be replaced by the use of an α,β-ethylenically unsaturated dicarboxylic acid of the type just mentioned as part or all of the polycarboxylic acid component used in producing the alkyd or polyester. Furthermore, the alkyd resins derived from an unsaturated diacid or anhydride of the type just mentioned may be supplemented, as by graft polymerization thereon, with styrene, methyl methacrylate, and/or other monoethylenically unsaturated monomers, e.g., esters of acrylic acid or other esters of methacrylic acid.

For the Type A compositions, any oil-modified alkyd resin except those derived from a dicarboxylic acid component that is predominantly or entirely aromatic, e.g., phthalic, can be employed as component b) as long as it has drying character. Examples of these are alkyds modified with natural resins such as rosin, copals, or ester gum. Maleic anhydride-modified types, phenolic-modified alkyd resins, and amino resin-modified types may also be used. In addition, maleinized-oil glycerides can be used and rosin adducts, that is, those containing rosin or abietic acid, maleic anhydride and glycerol. The type of alkyd resins known as terpene adducts may be employed. These various alkyds are described in "Encyclopedia of Chemical Technology," Kirk-Othmer, Volume 1, pages 521–528, published by Interscience Encyclopedia, Inc., N.Y., 1947.

In Type B Compositions of the invention, the alkyd is not limited to those in which the polycarboxylic acid component is predominantly or exclusively aromatic. In this variation wherein component a) contains 60 to 90% by weight of DCP(M)A and 40 to 10% by weight respectively of at least one ($C_{10}$–$C_{20}$) alkyl acrylate or methacrylate or ($C_{10}$–$C_{20}$) alkenyl acrylate or methacrylate, there can be used either the sort of alkyd required in Type A compositions (herein sometimes referred to as "soft") or alkyds including oil-modified alkyds, especially those of commercial type, wherein the polycarboxylic acid component is predominantly or even exclusively of aromatic type, e.g., those based on the manufacture using phthalic acid or anhydride.

While the description so far refers to compositions wherein the alkyd and reactive monomer comprising DCP(M)A are contained in a non-aqueous system, the present invention also contemplates aqueous systems wherein the alkyd is of water-soluble or water-dispersible type and an emulsifying agent may be used in a small amount effective to disperse the alkyd and reactive monomer in the aqueous system. Frequently, in such systems the emulsifying agent serves to emulsify a solution of alkyd in reactive monomer or of the latter in the alkyd. In some instances, depending on the particular partition coefficient of alkyd, water, and reactive monomer including DCP(M)A, the alkyd may be partly or entirely dissolved in the aqueous phase, and negligibly or partly dissolved in the DCP(M)A phase. Examples of emulsifiers that may be used in such dispersed systems include nonionic types, such as t-octylphenoxy-poly(10-40)ethoxyethanol, anionic types such as the sulfate of the nonionic type just mentioned, sodium lauryl sulfate, dioctyl sodium sulfosuccinate, or cationic types, such as dodecylbenzyltrimethylammonium chloride.

The compositions containing the main two components a) and b) spelled out hereinabove may be prepared and stored before they are used. Even compositions containing the three components a), b), and c) can be prepared and stored if certain precautions are taken. Normally such storing, especially of the three-component compositions, should be accomplished in sealed containers where availability of air or oxygen is avoided. However, the two components a) and b) with whatever other auxiliary components are to be used in the composition (other than the drier or, if used, volatile polymerization inhibitor or stabilizer e)) may be mixed and stored until the user is ready to employ the coating composition at which time component c) is added with or without the inhibitor or stabilizer e).

In the present invention, the polymerization or curing of the components a) and b) with each other and with any other material reactive therewith is quite distinct from the curing that would be obtained by free radical polymerization of the type occurring with polymerization initiators, such as benzoyl peroxide, or by the use of a photosensitizer (photoinitiator) for causing polymerization by means of radiation, such as ultraviolet light, electron beams, x-rays, etc. In the case of the conventional polymerization by means of radiation using a photosensitizer, the polymerization product obtained generally lacks durability. In contrast with the products obtainable using radiation and a photosensitizer, the cured products obtained in the present invention using a drier or siccative involve the incorporation of substantial amounts of oxygen in the final cured products. The drier in conjunction with the presence of oxygen, such as that of the atmosphere, is believed to cause reaction of the drying oil component of the alkyd with the double bond in the ring of the DCP(M)A and also with its other double bond to co-react the entire body of each of these reactants so that there is no significant residual DCP(M)A that is not covalently bonded in the cured product. However, it is not intended to be limited to this theory of coaction. When medium-oil or long-oil alkyds are involved in the composition, the use of the drier quite effectively cures the components a) and b), optionally with other components added, and does so while exposed to the atmosphere even at normal room temperature. Acceleration of the cure, of course, can be effected by heating as in a baking step (e.g., 40° to 150° C. or higher) in an oven. Similarly, the use of short-oil alkyd resins in conjunction with the drier may take longer to air dry at normal room temperatures and for these systems it is desirable to employ a baking step. Such baking steps may be effected at temperatures ranging from about 50° to 150° C., lower or higher as desired. The time of baking depends upon the particular composition involved and may vary from a few seconds, depending on the thickness of film, to half an hour or more.

The compatibility of the DCP(M)A manifests the desirable characteristic of providing solutions of the alkyd and the drier as well as any number of other resinous or polymeric materials that may be incorporated into the coating composition. When the use of volatile solvent materials is avoided by using the DCP(M)A with or without additional non-volatile monomers as the sole solvent material in the composition, there is obtained in effect a 100% solids coating composition and the curing of that composition avoids the necessity of introducing into the air or into the environment any volatile organic solvent. It also reduces the necessity to provide equipment for recovering a volatilized solvent from the system or equipment in which the curing is effected.

Of the various compositions mentioned hereinabove, the drying oil-modified alkyds are preferred because of their characteristic air-drying curing accelerated by the drier or driers included. The DCP(M)A is similarly air-dry cured simultaneously. The coatings obtained from those compositions wherein the alkyd is derived from predominantly to exclusively aliphatic components are characterized by outstanding resistance to discoloration or yellowing on exposure to ultraviolet light whereas the coatings obtained from those compositions in which the alkyd comprises a substantial proportion of aromatic components have outstanding qualities of hardness without excessive brittleness, tendency to discolor on weathering while retaining exceptional air-drying qualities. This combination of properties makes the latter compositions useful for a wide variety of coating purposes and this versatility is accomplished by the use in the compositions of a reactive monomer component containing a predominant proportion (60 to 90% by weight) of DCP(M)A with a minor but substantial amount (10 to 40% by weight) of a non-volatile, aliphatic monoethylenically unsaturated monomer having a terminal group of the formula $H_2C=C<$, of which $(C_{10}-C_{20})$ alkyl acrylates or methacrylates are representative. The compositions of the present invention wherein the alkyd is of unsaturated type as a result of the use of an unsaturated dicarboxylic acid, e.g., dimer acid (from linoleic acid polymerization), maleic, fumaric, (or an anhydride of the acid) in the absence of drying-oil modification, are adaptable to the making of oil-based lacquers, varishes, enamels, useful for factory finishing (by baking) of domestic and industrial appliances, siding, shingles, and other modular building components. In such compositions lacking the drying oil component, the curing depends on the development of a high flux of free radicals that cause the alkyd and the DCP(M)A to copolymerize through the unsaturated acrylate or methacrylate functionality before the oxidative action on the allylic type of unsaturation in the ring of DCP(M)A. Curing of such compositions may be hastened by introduction of a free radical initiator, such as benzoyl peroxide, in the compositions of the present invention containing an alkyd having both types of unsaturation, namely that derived from an $\alpha,\beta$-ethylenically unsaturated dicarboxylic acid and that from a drying oil, co-curing with the DCP(M)A involves not only the mechanism just discussed, but also autoxidation, which can, of course, be relied on to effectively air-dry or cure the films obtained on coating with the compositions exposed to the atmosphere at ambient temperature conditions. It is not intended to limit the invention to any theory suggested herein.

The following examples provide illustrative procedures to make and/or use compositions of the present invention. In these procedures, the parts and percentages are by weight and the temperatures are Centigrade unless otherwise noted.

EXAMPLE A

Preparation of a Long Linseed Oil Phthalic Alkyd Resin

To a flask equipped with a stirrer, thermometer, nitrogen inlet and a Vigreux distilling column with head there are charged linseed oil (430 parts) and glycerine (118 parts). The flask is heated to 250°–255° C and held at that temperature. The reaction is followed by diluting a sample with ethanol (1 vol sample/1 vol ethanol); it is complete when this dilution gives a homogeneous solution. Reaction time at 250° C is about 6 hours. The batch is then cooled to 160° C and phthalic anhydride (213 parts) and maleic anhydride (5 parts) are charged. The temperature is then slowly raised and water is distilled from the batch. Initially, water distillation is rapid and foaming may be a problem so that a slow heating rate from 160°–210° C may be required. Thereafter the batch is heated to and maintained at 235°–240° C. This stage of the reaction is followed by measuring viscosity and acid titer. Stopping conditions are a Gardner-Holdt viscosity of B-C for a 60% solution of resin in xylene at 25° C or an acid titer of 0.60 meq/g (acid no. = 34). When complete (1-3 hrs. at 240° C) the batch is cooled to 100°–125° C while maintaining the $N_2$ atmosphere before the resin (about 700 parts) is removed from the reactor.

EXAMPLES B THROUGH F

Preparation of Additional Alkyd Resins Using Aliphatic Dibasic Acids

The procedure of Example A is used to prepare solvent-free alkyd resins wherein all or part of the phthalic anhydride is replaced with equivalent amounts of various aliphatic dibasic acids. Additionally, in Example F, linseed oil is replaced with soya oil. Ingredients for the recipe are given in Table 1, together with characterization data on the products.

TABLE 1
(Examples B-F)

| Ingredient | B | C | D | E | F |
|---|---|---|---|---|---|
| linseed oil | 430 | 430 | 430 | 430 | |
| soya oil | | | | | 430 |
| phthalic anhydride | | | 107 | | |
| maleic anhydride | 5 | 5 | 5 | 5 | 5 |
| adipic acid | 210 | | | | 210 |
| azelaic acid | | 268 | 135 | | |
| dimer acid* | | | | 806 | |
| glycerine | 118 | 118 | 118 | 118 | 118 |
| Characterization of Resin | | | | | |
| acid number | 32 | 35 | 22 | 22 | 30 |
| Gardner Holdt Viscosity (60% in xylene) | D-E | C | B-C | B-C | B-C |
| Brookfield Viscosity (100%) | 10,000 | 5,000 | 20,000 | 15,500 | — |

*Emery Industries, Empol ® 1014

EXAMPLES 1-6

Solvent-Free Clear Coatings Based on DCPA or DCPMA and Alkyd Resins

The solvent-free alkyd resins described in Examples A-F are dissolved in DCPMA or DCPA in various proportions. In the fourth column of Table 2, MA refers to DCPMA and A refers to DCPA. To 100 parts of each mixture are added 1 part of cobalt naphthenate (6% metal) and 0.25 parts of methyl ethyl ketone oxime. After thorough mixing the coatings are applied to aluminum test panels, allowed to cure for 2 weeks at room temperature ambient, and then evaluated for basic mechanical properties as per Table 2. Use of the alkyd resins based on the aliphatic dicarboxylic acids results in a notably improved combination of viscosity reduction and hardness/flexibility balance. The flexibility test involves bending a cured film about mandrels of various diameters to determine the smallest diameter through which the film can be bent without crazing, cracking, or rupture.

TABLE 2

| Example | Alkyd Resin of Example | Parts: Alkyd | DCP(M)A | Viscosity | Pencil Hardness | Knoop Hardness No. | Mandrel Flexibility (inches) |
|---|---|---|---|---|---|---|---|
| 1 | A | 60 | 40 MA | Z-2 | 2B | 3.6 | 3 |
| | | 40 | 60 MA | p | F | 13.7 | >6 |
| | | 60 | 40 A | Z-1 | B | 1.8 | 2 |
| 2 | B | 60 | 40 MA | Y | 6B | 1.0 | <½ |
| | | 50 | 50 MA | V | 4B | 2.5 | 2 |
| | | 40 | 60 MA | Q | F | 2.0 | 3 |
| | | 60 | 40 A | X | 5B | 0.6 | <½ |
| | | 50 | 50 A | V | HB | 5.5 | <½ |
| | | 40 | 60 A | R | F | 3.7 | <½ |
| 3 | C | 60 | 40 MA | U | 4B | 1.6 | <½ |
| | | 50 | 50 MA | O | HB | 1.6 | 3 |
| | | 40 | 60 MA | H | F | 3.0 | >3 |
| | | 60 | 40 A | U | F | 4.8 | <½ |
| | | 50 | 50 A | O | 4B | 2.8 | <½ |
| | | 40 | 60 A | I | H | 4.1 | 1 |
| 4 | D | 60 | 40 MA | V-W | 3B | 2.3 | 1½ |
| | | 50 | 50 MA | N | F | 4.1 | 3 |
| | | 40 | 60 MA | H-I | F | 9.1 | 5 |
| | | 60 | 40 A | U-V | B | 1.8 | <½ |
| | | 50 | 50 A | O | HB | 4.1 | <½ |
| | | 40 | 60 A | I | 2H | 5.8 | 1½ |
| 5 | E | 60 | 40 MA | W | HB | 1.4 | 2 |
| | | 50 | 50 MA | S | H | 3.6 | 3 |
| | | 40 | 60 MA | J-K | B | 9.1 | 5 |
| | | 60 | 40 A | V-W | 3B | 1.0 | <½ |
| | | 50 | 50 A | R | F | 3.5 | 1½ |
| | | 40 | 60 A | K-J | H | 5.8 | 3 |
| 6 | F | 60 | 40 MA | S | 6B | — | ½ |
| | | 50 | 50 MA | J | 5B | 4.1 | ½ |
| | | 40 | 60 MA | E-F | F | 1.5 | 3 |
| | | 60 | 40 A | S | F | 3.0 | <½ |
| | | 50 | 50 A | K | F | 1.3 | ½ |
| | | 40 | 60 A | E-F | HB | 1.8 | ½ |

EXAMPLE 7

Solvent-Free Clear Coatings Based on DCPMA and a Phthalic Alkyd Resin

The alkyd resin of Example A is dissolved in DCPMA or DCPA, or mixtures thereof with cetyl methacrylate (CEMA).*

To 100 parts of each mixture is added 1 part of cobalt napthenate (6% metal) and 0.25 parts of methyl ethyl ketone oxime. The coatings are applied, cured, and evaluated as in Examples 1-6. Modification with the long chain methacrylate monomer permits the formation of coatings based on the phthalic alkyd resin and DCP(M)A that avoid excessive hardening and embrittlement (Table 3).

TABLE 3

| Parts Alkyd | DCP (M) A | CEMA | Viscosity | Pencil Hardness | Knoop Hardness No. | Mandrel Flexibility (inches) |
|---|---|---|---|---|---|---|
| 60 | 40 MA | — | Z-1 | 4.5 | B | 3 |
| 60 | 40 A | | X | 3.3 | F | 2 |
| 60 | 32 MA | 8 | Z | 1.2 | HB | 1½ |
| 60 | 32 A | 8 | X | 1.1 | HB | 1½ |

*A crude mixture of methacrylates of aliphatic alcohols having the following number of carbonatoms:
less than $C_{16}$ (side chain) 2%
$C_{16}$ 51

TABLE 3-continued

| Parts | | | | Pencil | Knoop | Mandrel Flexibility |
|---|---|---|---|---|---|---|
| Alkyd | DCP (M) A | CEMA | Viscosity | Hardness | Hardness No. | (inches) |
| | | $C_{18}$ | | | 31 | |
| | | $C_{20}$ | | | 12 | |
| | more than | $C_{20}$ | | | 1 | |

EXAMPLES 8–12

$TiO_2$ Pigmented Paints Based on Alkyd Resins and DCPMA

A. Solvent thinned alkyd paints are prepared as follows from the resins of Examples A, B, C, D, and E:

| Ingredients | Pounds | Gallons |
|---|---|---|
| alkyd resin (100%) | 408.8 | 46.8 |
| rutile $TiO_2$ | 373.0 | 10.9 |
| zinc oxide | 19.1 | 0.4 |
| mineral spirits | 134.2 | 20.5 |

The above are mixed and ground on a three-roll dispersion mill to a Hegman 7 fineness of grind rating. The paste was then letdown with:

| | | |
|---|---|---|
| mineral spirits | 134.2 | 20.5 |
| cobalt naphthenate (6%) | 4.1 | 0.28 |
| lead naphthenate (24%) | 8.5 | 0.42 |
| methyl ethyl ketone | 1.0 | 0.14 |
| oxime | 1082.9 | 100.0 |

B. 100 Percent convertible paints are prepared using the alkyd resins of Examples A through E and DCPMA as the reactive diluent:

| Ingredients | Pounds | Gallons |
|---|---|---|
| alkyd resin (100%) | 350.5 | 40.0 |
| rutile $TiO_2$ | 651.1 | 19.0 |
| zinc oxide | 33.0 | 0.7 |
| DCPMA | 165.0 | 19.8 |

The above are ground as in A and the paste is letdown with:

| | | |
|---|---|---|
| DCPMA | 165.0 | 19.8 |
| cobalt naphthenate (6%) | 6.86 | 0.46 |
| methyl ethyl ketone | 0.85 | 0.11 |
| oxime | 1372.3 | 100.0 |

Both paints A and B have the same pigment volume concentration in the dried and cured film (20 PVC). The solvent thinned paint, however, has 25 percent volatile by weight (41 percent by volume). All paints have a viscosity of 135–140 Krebs Units.

The paints are filmed on Alodine-treated aluminum and on clean cold-rolled steel test panels to yield 2.5 mil films when dry. All paints dry to a tack-free state in approximately 16 hours. After two weeks air-drying at room temperature ambient conditions, the following physical property characteristics are obtained:

| Example: | 8 | | 9 | | 10 | | 11 | | 12 | |
|---|---|---|---|---|---|---|---|---|---|---|
| Alkyd of Example: | A | | B | | C | | E | | D | |
| Paint Type: | A | B | A | B | A | B | A | B | A | B |
| Properties: | | | | | | | | | | |
| Knoop Hardness Number | 0.75 | 12.5 | 0.57 | 4.1 | 0.44 | 3.2 | 0.67 | 2.8 | 0.92 | 7.3 |
| Pencil Hardness | 6B | E | 5B | F | 5B | F | 6B | HB | 5B | HB |
| Mandrel Flex, in. | ⅛ | 6½ | ⅛ | ⅜ | ⅛ | ⅝ | ⅛ | ⅛ | ⅛ | 2 |
| Solvent Resistance (on aluminum) (Rated as film deterioration with 10 = no effect; 0 = complete failure) | | | | | | | | | | |
| a) 165° F, 1% Tide, 3 hrs. | 0 | 10 | 0 | 10 | 1 | 10 | 2 | 10 | 5 | 10 |
| b) methyl ethyl ketone, 3 hrs. | 1 | 1 | 5 | 5 | 3 | 5 | 10 | 10 | 10 | 10 |
| c) toluene, 3 hrs. | 1 | 1 | 5 | 3 | 5 | 5 | 10 | 10 | 10 | 10 |
| d) isooctane, 3 hrs. | 10 | 10 | 10 | 10 | 10 | 10 | 10 | 10 | 10 | 10 |
| e) $NH_4OH$ (28%), 3 hrs. | 2 | 5 | 2 | 6 | 2 | 6 | 5 | 10 | 5 | 10 |
| f) KOH (10%), 15 min. | 1 | 10 | 1 | 10 | 1 | 10 | 1 | 10 | 1 | 10 |
| g) HCl (10%), 3 hrs. | 1 | 8 | 1 | 5 | 1 | 8 | 10 | 10 | 10 | 10 |
| Anti-Corrosion Properties (on steel) - Salt Spray (500 hours) | | | | | | | | | | |
| a) general rust | 10 | 10 | 6 | 10 | 8 | 10 | 0 | 5 | 8 | 10 |
| b) undercoat corrosion | 10 | 10 | 6 | 10 | 8 | 10 | 0 | 3 | 6 | 10 |
| c) blisters | 10 | 10 | 6 | 10 | 7 | 10 | 0 | 7 | 7 | 10 |

While the conventional alkyd (Ex. A) is excessively soft (Paint Type A of Ex. 8), modification with DCPMA results in excessive hardening and embrittlement (Paint Type B of Example 8). The partly or wholly aliphatic alkyds at the same level of DCPMA modification result in an excellent balance of coating hardness and flexibility. DCPMA also dramatically improves the chemical and corrosion resistance properties of the alkyd resins.

EXAMPLE 13

Solvent-Free Paints Based on Phthalic Alkyd Resins and Mixtures of DCPMA and a Long Chain Alkyl Methacrylate Solvent-free paints are prepared according to procedure B of Examples 8–12 using the alkyd resin described in Example A. The DCPMA in the letdown is replaced with increasing amounts of cetyl methacrylate described in Example 7, the total of DCPMA and cetyl methacrylate remaining constant at 165 pounds. Films are prepared, cured, and evaluated as described in Examples 8–12 with the following results:

| | Percent Cetyl Methacrylate in Diluent Monomer Portion of Paint: | | | | | |
|---|---|---|---|---|---|---|
| | 0 | 10 | 20 | 30 | 40 | 50 |
| Knoop Hardness Number | 16.8 | 13.8 | 11.2 | 2.8 | 0.7 | 0.6 |
| Pencil Hardness | F | F | F | B | 6B | 6B |
| Mandrel Flex, in. | 6-½ | 5 | 4 | 2 | ⅜ | ¼ |

EXAMPLE 14

Water-Borne Coating Comprising a Water-Dispersed Alkyd Resin and DCPMA

The base alkyd resin is Arolon 585 (Ashland Chemicals), a short safflower oil alkyd resin supplied as 42 parts solids in 57 parts water and 1 part triethylamine. Paints are prepared as follows:

| Ingredients | Paint A | Paint B |
|---|---|---|
| Arolon 585 (42%) | 266.6 | 266.6 |
| Rutile TiO$_2$ | 225.4 | 225.4 |

The above are mixed and ground on a 3-roll mill to a Hegman reading of 7 and then letdown with:

| Arolon 585 | 451.1 | 235.8 |
|---|---|---|
| DCPMA | — | 90.4 |
| Butyl Carbitol | 21.4 | 21.4 |
| Triton X-405 | 6.3 | 6.3 |
| Cobalt naphthenate (6%) | 2.3 | 2.3 |
| Lead naphthenate (24%) | 0.43 | 0.43 |
| Water | 72.4 | 197.3 |

Pigment volume concentration of both paints is approximately 15 percent.

The paints are applied to aluminum test panels to yield 2-mil dry films. After two weeks drying at room temperature film properties are found to be:

| | Paint A | Paint B |
|---|---|---|
| Knoop Hardness Number | 1.0 | 8.0 |
| Pencil Hardness | 3B | HB |

EXAMPLE 15

Water-Borne Coating Comprising an Emulsified Solventless Alkyd/DCPMA Paint

2 Parts of dioctyl sodium sulfosuccinate surfactant is blended with 100 parts of paint Type B of Example 12. This mixture is then stirred into 100 parts of water to yield a coarse dispersion. A stable, low viscosity paint emulsion is obtained by passing the coarse dispersion 5 times through a hand-operated Logeman Mulsifier. The emulsified paint, when applied and cured as in Examples 8–12, yields a coating having essentially the same film properties as described for paint Type B of Example 12.

EXAMPLE 16

Water-Borne Coating Comprising a Water-Soluble Alkyd Resin and DCPMA

The base alkyd resin is Arolon 376 (Ashland Chemicals), a medium-short safflower oil alkyd resin supplied at 50 parts in a mixture of t-butanol, butoxyethanol, water, and triethylamine; 12.5, 12.5, 21.7, and 3 parts respectively. Paints are prepared as follows:

| Ingredients | Paint A | Paint B |
|---|---|---|
| Arolon 376 (50%) | 122.7 | 122.7 |
| Rutile TiO$_2$ | 169.9 | 169.9 |

The above are mixed and ground on a 3-roll mill to a Hegman reading of 7 and then letdown with:

| Arolon 376 (50%) | 302.8 | 175.1 |
|---|---|---|
| DCPMA | — | 63.8 |
| mineral thinner | 3.4 | 3.4 |
| cobalt naphthenate (6%) | 1.8 | 1.8 |
| lead naphthenate (24%) | 0.4 | 0.4 |
| water | 375.1 | 438.9 |

Pigment volume concentration of both paints is about 17 percent.

The paints are applied to aluminum test panels to yield 2-mil dry films. After two weeks drying at room temperature, film properties are found to be:

| | Paint A | Paint B |
|---|---|---|
| Knoop Hardness Number | 0.7 | 3.6 |
| Pencil Hardness | 4B | HB |

EXAMPLE 17

Solventless Coating Comprising an Oil-Free Maleic Anhydride Polyester and DCPMA

An unsaturated polyester resin is prepared by condensing 1 mole of maleic anhydride with 1.05 moles of dipropylene glycol to a weight average molecular weight of 2500. Fifty parts of the polyester resin are first dissolved in 50 parts of DCPMA and then 1 part of cobalt naphthenate (6% cobalt) is added to the mixture. A 1.6 mil film is cast on an aluminum test panel and allowed to dry at room temperature ambient. Drying to tack-free surface occurs in about 12–18 hours. After cure for two weeks pencil hardness is F and Knoop hardness number is 11.6.

EXAMPLE 18

Solvent-Free Coating Compositions Based on a Phthalic Alkyd Resin and Mixtures of DCPMA and a Furmarate Diester The alkyd resin of Example A is dissolved in DCPMA or mixtures thereof with dibutyl fumarate. To 100 parts of each mixture is added 1 part of cobalt naphthenate (6% metal). The coatings are applied, cured, and evaluated as in Examples 1–6. Partial modification of the diluent portion of the coating with the fumarate ester avoids excessive hardening and embrittlement while maintaining low application viscosity (Table 3A). Compare Ex. 7.

TABLE 3A

| Parts | | | Viscosity | Pencil Hardness | Knoop Hardness No. | Gardner Rev. Impact (in-lb) |
| --- | --- | --- | --- | --- | --- | --- |
| Alkyd | DCPMA | Dibutyl Fumarate | | | | |
| 50 | 50 | — | N | B | 7.6 | <2 |
| 50 | 40 | 10 | J | B | 1.9 | <2 |
| 50 | 30 | 20 | J | HB | 0.3 | 4 |
| 50 | — | 50 | G | <6B* | <<0.1* | — |

*tacky, poor cure

We claim:

1. An autoxidizable composition adapted to be used for coating and/or impregnating a substrate consisting essentially of:
   a. reactive non-volatile monomeric material selected from
      1. a monomeric material consisting essentially of dicyclopentenyl acrylate or dicyclopentenyl methacrylate or a mixture thereof, such material being referred to generically by the term DCP(M)A, and
      2. a monomeric material comprising a predominant proportion of DCP(M)A and a minor proportion of an ester of an aliphatic alcohol having 10 to 20 carbon atoms with acrylic acid or methacrylic acid;
   b. a polyol-polycarboxylic acid alkyd or polyester resin having at least one unsaturated component selected from (1) maleic acid or anhydride or furmaric acid moieties and (2) drying or semi-drying oil moieties, said resin being formed from a polycarboxylic acid or anhydride, the alkyd being selected respectively from
      1. alkyds in which the polycarboxylic acid precursor component comprises a dicarboxylic acid which is predominantly to exclusively an aliphatic dicarboxylic acid or anhydride having at least 4 carbon atoms, this alkyd being used with reactive monomer (1) above, and
      2. alkyds in which the polycarboxylic acid precursor component comprises a dicarboxylic acid which is predominantly to exclusively an aromatic dicarboxylic acid or anhydride, this alkyd being used with reactive monomer (2) above; and
   c. an effective amount of a metal salt or complex drier or siccative.

2. A composition according to claim 1 which comprises 0.1 to 2% of a volatile oxime stabilizer.

3. A composition according to claim 1 in which the relative proportions between a) and b) are 15 to 75% by weight of a) and 85 to 25% by weight of b) respectively.

4. A composition according to claim 3 which also comprises a metal salt drier in an amount of 0.0005 to 2% of metal based on the total weight of a) + b).

5. A composition according to claim 1 in which the components a) and b) are dispersed in an aqueous medium.

6. A liquid composition adapted to serve as a vehicle in making a composition according to claim 1, the liquid composition consisting essentially of a liquid mixture of non-volatile reactive monomers having therein
   1. at least one member selected from DCP(M)A and
   2. at least one member selected from the group consisting of:
      a. an ester of a ($C_{10}$–$C_{20}$) aliphatic alcohol with acrylic acid or methacrylic acid,
      b. a vinyl ester of a ($C_{10}$–$C_{20}$) aliphatic acid, and
      c. a dialkyl ester of an acid selected from maleic, fumaric, and itaconic acid in which the alkyl groups have 1 to 20 carbon atoms.

7. A composition according to claim 6 in which the liquid mixture contains at least 1% by weight of (1) and up to 99% by weight of (2).

8. A composition according to claim 7 in which the proportion of (1) is at least 51% and that of (2) does not exceed 49%.

9. A composition according to claim 8 in which the component (2) is selected from the group of acrylic acid or methacrylic acid esters of the subgroup (a) recited in claim 16.

10. A composition according to claim 9, in which the proportion of DCP(M)A is about 40 to 90% by weight of the liquid mixture.

11. An autoxidizable composition adapted to be used for coating and/or impregnating a substrate comprising a) reactive non-volatile monomeric material comprising at least a predominant proportion of one of dicyclopentenyl acrylate and dicyclopentenyl methacrylate and b) a drying oil-modified polyol/polycarboxylic acid polyester resin dissolved therein, the polycarboxylic acid component of the polyester being predominantly to exclusively an aliphatic dicarboxylic acid having at least 4 carbon atoms, the carboxyl groups being separated by a hydrocarbon group having at least 2 carbon atoms.

12. A composition according to claim 11 in which the relative proportions between a) and b) are 15 to 75% by weight of a) and 85 to 25% by weight of b) respectively.

13. A composition according to claim 12 which also comprises a metal salt drier in an amount of 0.0005% to 2% of metal based on the total weight of a) + b).

14. An autoxidizable composition adapted to be used for coating and/or impregnating a substrate comprising:
   a. a reactive monomeric material comprising a mixture of a predominant proportion of DCP(M)A and a minor proportion of an ester of an aliphatic alcohol having 10 to 20 carbon atoms with acrylic acid or methacrylic acid or a dialkyl fumarate, maleate, or itaconate in which the alkyl groups are selected from ($C_1$ to $C_8$) alkyl groups, and
   b. an oil-modified polyol-polycarboxylic acid alkyd or polyester resin dissolved therein, the polycarboxylic acid precursor of the alkyd comprising a predominant to exclusive proportion of an aromatic dicarboxylic acid or anhydride,
the relative proportions between a) and b) being 15 to 75% by weight of a) and 85 to 25% of b) respectively.

15. The composition according to claim 14, in which the proportion of DCP(M)A in the reactive material a) is from 60 to 90% by weight thereof.

16. An autoxidizable composition adapted to be used for coating and/or impregnating a substrate comprising:
   a. reactive non-volatile monomeric material comprising at least a predominant proportion of one of dicyclopentenyl acrylate and dicyclopentenyl methacrylate and b. a polyol/polycarboxylic acid polyester resin having at least one unsaturated component dissolved in a), the polycarboxylic acid component of the polyester being predominantly to exclusively an aliphatic dicarboxylic acid having at least 4 carbon atoms and having a hydrocarbon group of at least 2 carbon atoms extending between the carboxyl groups, said acid component comprising an α,β-ethylenically unsaturated aliphatic dicarboxylic acid, at least part of the curing functionality in the resin being attributable to the last-mentioned diacid component.

17. A composition according to claim 16 in which the last-mentioned diacid is maleic acid or anhydride.

18. A composition according to claim 16 in which at least a portion of the aliphatic dicarboxylic acid used is a dimer acid from linoleic acid polymerization.

19. A composition according to claim 16 in which the polyester is modified by reaction with a drying oil.

20. A cross-linked solid product obtained by the curing of a composition according to claim 1 at a temperature ranging from ambient temperature to about 150° C.

21. A cross-linked solid product obtained by the curing of a composition according to claim 4 at a temperature ranging from ambient temperature to about 150° C.

22. A cross-linked solid product obtained by the curing of a composition according to claim 13 at a temperature ranging from ambient temperature to about 150° C.

23. A cross-linked solid product obtained by the curing of a composition according to claim 14 to which an effective amount of a siccative has been added at a temperature ranging from ambient temperature to about 150° C.

24. A cross-linked solid product obtained by the curing of a composition according to claim 17 to which an effective amount of a siccative has been added at a temperature ranging from ambient temperature to about 150° C.

* * * * *

UNITED STATES PATENT AND TRADEMARK OFFICE
CERTIFICATE OF CORRECTION

PATENT NO. : 4,071,489

DATED : January 31, 1978

INVENTOR(S) : William D. Emmons, Kayson Nyi and Peter R. Sperry

It is certified that error appears in the above-identified patent and that said Letters Patent are hereby corrected as shown below:

Claim 4, line 1 - "A composition according to claim 3 which also"

should read -- A composition according to Claim 3 which --.

*Signed and Sealed this*

*Seventh* Day of *November 1978*

[SEAL]

Attest:

RUTH C. MASON
*Attesting Officer*

DONALD W. BANNER
*Commissioner of Patents and Trademarks*